(12) United States Patent
Doten

(10) Patent No.: US 10,046,186 B2
(45) Date of Patent: Aug. 14, 2018

(54) MODULAR POLYMER GEL PREPARATION SYSTEM FOR AIRCRAFT

(71) Applicant: Leonard E. Doten, Cold Springs, CA (US)

(72) Inventor: Leonard E. Doten, Cold Springs, CA (US)

(*) Notice: Subject to any disclaimer, the term of this patent is extended or adjusted under 35 U.S.C. 154(b) by 347 days.

(21) Appl. No.: 14/623,766

(22) Filed: Feb. 17, 2015

(65) Prior Publication Data

US 2016/0236022 A1 Aug. 18, 2016

(51) Int. Cl.
| | |
|---|---|
| A62C 3/02 | (2006.01) |
| A62C 5/00 | (2006.01) |
| A62C 5/033 | (2006.01) |
| B64D 1/16 | (2006.01) |

(52) U.S. Cl.
CPC ............ *A62C 3/0235* (2013.01); *A62C 5/002* (2013.01); *A62C 5/033* (2013.01); *B64D 1/16* (2013.01)

(58) Field of Classification Search
CPC ... A62C 3/0228; A62C 3/0235; A62C 3/0242; A62C 5/002; A62C 5/033; A62C 31/00; A62C 3/02; A62C 31/28; B64D 1/19; B64D 1/16; B64D 1/18
USPC .......... 169/34, 53, 52, 54; 239/171; 244/136
See application file for complete search history.

(56) References Cited

U.S. PATENT DOCUMENTS

| | | | | |
|---|---|---|---|---|
| 3,714,987 A | * | 2/1973 | Mattson | B64D 1/16 137/533.13 |
| 4,240,507 A | * | 12/1980 | Hokkanen | B64D 1/16 169/13 |
| 4,601,345 A | * | 7/1986 | Mahrt | B64D 1/16 169/14 |
| 6,125,942 A | | 10/2000 | Kaufman | |
| 6,626,375 B1 | * | 9/2003 | Ireland | B64D 1/18 169/53 |
| 6,889,776 B2 | | 5/2005 | Cheung | |
| 7,708,082 B2 | | 5/2010 | Hall | |
| 2006/0175429 A1 | | 8/2006 | Lanigan | |
| 2010/0155132 A1 | | 6/2010 | Maganas | |
| 2011/0203812 A1 | * | 8/2011 | Doten | A62C 3/0235 169/44 |

(Continued)

FOREIGN PATENT DOCUMENTS

WO WO 2001/044137 6/2001

*Primary Examiner* — Jason Boeckmann
*Assistant Examiner* — Cody Lieuwen
(74) *Attorney, Agent, or Firm* — Heisler & Associates (57) ABSTRACT

The system includes a pod suspended beneath the aircraft and above a water fillable and emptyable bucket. Polymer gel emulsion preparation equipment is included at the bucket. The pod includes an elongate shaft for carrying structural loads between a cable extending down from the aircraft and the bucket. The pod also includes a polymer gel tank. A polymer gel pump delivers polymer gel to the polymer gel emulsion preparation equipment within the bucket when required. The pod is configured to include a pathway for routing of various lines from the aircraft down to the bucket, and past the polymer gel tank. Sub-systems for filling the polymer gel tank and for equalizing pressure within the polymer gel tank are also included with the pod, so that the pod provides a modular polymer gel storage for use with polymer gel emulsion preparation equipment within a bucket suspended beneath the aircraft.

11 Claims, 5 Drawing Sheets

(56) References Cited

U.S. PATENT DOCUMENTS

2012/0193458 A1* 8/2012 Wheeler ............. A01M 7/0014
                                                       239/722
2014/0069666 A1* 3/2014 Vetesnik ............. A62C 3/0235
                                                       169/53

* cited by examiner

MODULAR POLYMER GEL PREPARATION SYSTEM FOR AIRCRAFT

FIELD OF THE INVENTION

The following invention relates to firefighting aircraft and particularly rotary wing aircraft which carry buckets suspended therefrom for firefighting. More particularly, this invention relates to firefighting aircraft with buckets suspended therefrom which are also configured to supply polymer gel to the water and fully prepare and activate the water and polymer gel emulsion before delivery for maximum firefighting effectiveness.

BACKGROUND OF THE INVENTION

In the fighting of wildfires, a variety of fire suppression materials are known, as well as equipment for delivery of such fire suppression materials. Perhaps the most common fire suppression material is liquid water. Water can be delivered on a fire, or a space which is to be treated in advance to stop the progression of a fire, in a variety of different ways. For instance, hoses can deliver water from a stationary source such as a fire hydrant, or from a mobile source such as a fire truck. Water tenders are known which can deliver water from tanks on the vehicle to ground adjacent the vehicle, with or without use of hoses.

Aircraft can also be used for delivery of water for fire suppression. While fixed wing aircraft are sometimes used, most often water is delivered by rotating wing aircraft. In a typical such system, a bucket is suspended from a helicopter. The bucket can be dipped into a water reservoir to fill the bucket or be pumped into the bucket. The helicopter then transports the bucket to an area to be treated with the water. A floor or other portion of the bucket is openable to drain the bucket of water and treat the area beneath the bucket. The helicopter then repeats the filling procedure for additional treatment of areas with water. One such line of buckets is provided by S.E.I. Industries, Ltd. of Delta, British Columbia, Canada under the trademark BAMBI BUCKET.

Fire suppression gels are known in the art to have a greater effectiveness in suppressing fire than water alone. Such gels typically begin in the form of a concentrate which can be a solid or a liquid having a high concentration of gel compositions therein. This gel is hydrated to a most desirable water and gel mixture ratio and then is applied to an area to either directly extinguish fire or to treat an area in advance of an approaching fire to impede the progress of the fire, or otherwise suppress fire in the area being treated. Such fire suppression gels, when mixed with water, greatly enhance the effectiveness of the water in suppressing the fire. In particular, the water in the hydrated gel coatings do not evaporate as quickly as water alone, thus maintaining a coating of the area to be treated and discouraging the combustion of combustible materials in the area being treated. One such polymer material is provided under the trademarks FIREWALL ULTRA, provided by BroadRange Wildland Fire Chemicals of Cold Springs, Calif. and FIREWALL II, provided by Eco FireSolutions of Carmichael, Calif., in the form of a liquid emulsion.

While the use of such fire suppression gels is known when treating an area with fire hoses either coupled to stationary sources of water or hydrated gel; or from mobile ground sources (such as tanker trucks), a need exists for an effective airborne fire suppression gel delivery system. While a bucket or other container filled with hydrated gel could be utilized, such an arrangement would be inefficient in that frequent return trips to a source of hydrated gel would be required. Accordingly, a need exists for a system for onboard manufacture of such a water and fire suppression gel mixture on an airborne platform.

Furthermore, water buckets and fixed tanks deliver water to an area to be treated for fire suppression in a rather imprecise manner, merely involving the opening of a lower portion of the bucket or tank. While generally effective for water having a lower fire suppression capacity, with the utilization of fire suppression gel it is desirable that a mixture of water and fire suppression gel be applied to an area to be treated in a precise manner to maximize the fire suppression capability of the gel and minimize the number of repeat trips required and maximize the length of fire line being treated by an airborne vehicle. Thus a need exists for polymer gel emulsion discharge options other than (or augmenting) bucket dumping.

For effective operation of a polymer gel emulsion preparation system a supply of polymer gel emulsion must be carried by the aircraft. A need exists for a convenient location to place such a polymer gel supply tank, which allows such a tank to be readily filled and to position the tank near a center of gravity and center of lift of the aircraft for safe and simple operation of the aircraft and suspended bucket system, and modular and removably attachable so that the aircraft (and bucket) can be reconfigured quickly for various different missions.

SUMMARY OF THE INVENTION

With this invention a modular polymer gel preparation system is provided for storage and delivery of polymer gel to a bucket supported polymer gel emulsion preparation assembly. The system is contained and carried by a pod which is suspended beneath the aircraft and above the water fillable and emptyable bucket, also suspended from the aircraft by the same cable. The pod provides a polymer gel emulsion tank and associated equipment for refilling the polymer gel tank and a polymer gel dosing pump for supply of appropriate amounts of polymer gel down to the bucket where the polymer gel emulsion preparation assembly is located. This preparation assembly is typically in the form of a water intake and a dynamic pump, as well as preferably a nozzle for controlled output of water and activated polymer gel emulsion therefrom. As an alternative, the bucket can be configured for dumping of the combined water and activated polymer gel emulsion.

The overall structure suspended between the bucket and the aircraft is conveniently referred to as a pod in that it is a largely a self-contained structure interposed between the aircraft and the bucket. Such a position for the pod is advantageous in that it does not increase the overall height of the aircraft and bucket system, only adds weight at the center of gravity and center of lift of the overall system, avoids crowding portions of the aircraft within a cabin thereof, and is in a position where to some extent gravity must not be overcome in supplying polymer gel to the bucket for combination with the water.

The pod includes structural equipment so that the pod can carry the tension loads from the aircraft through to the bucket in one embodiment, especially when such loads include the weight of the bucket when filled with water. While the structural strength of the pod could be provided in different ways, most preferably in this preferred embodiment an elongate shaft is provided which supplies the bulk of the tensile strength of the pod along a vertical axis. This elongate shaft is preferably located along a center line extending vertically through the pod, such that the shaft is in the form of a central shaft. A hollow core supplies a pathway through which various lines can pass down to the bucket and/or to lower portions of the pod. These lines include hydraulic lines or other power lines for powering the polymer gel emulsion preparation assembly/equipment within the bucket, primarily in the form of a dynamic pump, as well as a control line which can provide control signals to valves, pump operation switches, and potentially other controllable elements within the bucket. An upper end of the central shaft is configured in one embodiment to be attachable to a cable extending down from the aircraft. A lower end of the central shaft is configured in this embodiment to have the bucket suspended therefrom.

A polymer gel tank is located within the pod inboard of an outer wall which is preferably cylindrical and preferably surrounding the central shaft with the central shaft passing through a center thereof. This tank is generally defined as a space between an upper bulkhead and a lower bulkhead. These two bulkheads are preferably parallel with each other and spaced from each other with the upper and lower bulkheads preferably oriented within planes perpendicular to the central shaft, and with the central shaft passing through each bulkhead. An outer wall of the tank has a diameter similar to that of the bulkheads in this embodiment, so that the tank is defined by a space inboard of the outer wall and between the upper and lower bulkheads, with the central shaft passing therethrough. Tanks having other configurations could alternatively be provided within or carried by the pod.

A polymer gel pump is included within the pod, typically adjacent to the tank. Most preferably, this polymer gel pump includes a motor portion and a driver portion with the driver portion driven by the motor and the driver portion configured to drive polymer gel from the tank to the polymer gel emulsion preparation assembly at the bucket. In a preferred embodiment, the motor is located within the tank and upon an upper surface of the lower bulkhead with the driver located below the lower bulkhead, and with a drive shaft from the motor of the polymer gel pump passing through the lower bulkhead and driving the driver. A polymer outlet leads through the lower bulkhead from the polymer gel tank, and then passes into and out of the driver where the polymer gel is acted upon and driven toward the polymer gel emulsion preparation equipment within the bucket.

The tank is also configured to have a fill tube or other inlet for loading of polymer gel emulsion into the tank. Preferably, this is in the form of a fill tube passing through the upper bulkhead. As an alternative, such input of polymer gel emulsion into the tank could occur through the outer wall of the tank between the bulkheads. Typically, this fill tube or other input has a cover thereon which can be removably attached. Legs are optionally but preferably pivotably attached to the upper bulkhead which can pivot from a collapsed and stored position adjacent the bulkhead to a deployed position which causes the pod to be able to rest upon the ground somewhat laterally, but with the legs causing the upper bulkhead to be higher than the lower bulkhead and to cause the fill tube to be more readily accessed. Such an orientation also always ensures that the fill tube is oriented pointing upwardly so that the tank can be completely filled when the pod is resting on its legs.

A pressure equalization system is preferably provided for the tank which maintains pressure close to atmospheric pressure within an interior of the tank. In a preferred embodiment, this pressure equalization assembly passes through the upper bulkhead and terminates at a tee with a pair of output tips including an upper output tip further from the upper bulkhead and a lower output tip closer to the upper bulkhead. The uppermost tip can be configured for pressure relief and the lowermost tip can be configured for vacuum relief, such as by properly orienting spring loaded check valves thereon. By keeping pressure within the tank close to atmospheric pressure, the bulkheads and outer wall of the tank do not need to have structural strength to accommodate pressure differences encountered during flying of the aircraft, often in mountainous terrain where significant pressure differentials are encountered, to keep the pod as light as possible and concentrate the greatest structural strength with the bucket-carrying elongate shaft.

Objects of the Invention

Accordingly, a primary object of the present invention is to provide a modular polymer gel storage and delivery system which can store polymer gel conveniently suspended from an aircraft which also has a water fillable and emptyable bucket suspended therefrom.

Another object of the present invention is to provide a pod for storing polymer gel between an aircraft and a bucket suspended from the aircraft.

Another object of the present invention is to provide a pod for supplying polymer gel to polymer gel emulsion preparation equipment carried by a bucket suspended from an aircraft.

Another object of the present invention is to provide a polymer gel storage and delivery system which has sufficient strength to allow a bucket filled with water to be suspended therefrom while the structure is itself suspended from an aircraft.

Another object of the present invention is to provide a pod interposed between an aircraft and a bucket suspended from the aircraft, which pod allows for various service lines to pass therethrough between the bucket and the aircraft for control of various systems within the bucket, while also containing polymer gel and supplying polymer gel to the bucket.

Another object of the present invention is to provide a polymer gel storage and delivery system which can be controlled to supply a desired amount of polymer gel emulsion to water to maximize the firefighting effectiveness of the water.

Another object of the present invention is to provide a polymer gel storage tank which is lightweight yet can carry polymer gel therein with various degrees of fill and avoid damage due to pressure or vacuum buildup within the tank.

Another object of the present invention is to provide a method for supply of polymer gel to water and polymer gel emulsion preparation equipment at a bucket carried by a rotary wing aircraft.

Another object of the present invention is to provide a firefighting aircraft with a bucket suspended via a cable, and with a water and polymer gel emulsion preparation system carried by the bucket and a polymer gel storage tank also suspended from the aircraft, the bucket optionally configured for delivery of water and polymer gel emulsion by dumping or spray from a nozzle.

Other further objects of the present invention will become apparent from a careful reading of the included drawing figures, the claims and detailed description of the invention.

DESCRIPTION OF THE PREFERRED EMBODIMENT

Referring to the drawings, wherein like reference numerals represent like parts throughout the various drawing figures, reference numeral 10 is directed to a pod (FIGS. 1-4) which carries a tank 70 fillable with polymer gel for use within a polymer gel storage, delivery and preparation system, such as an aircraft 2 with a water fillable bucket 4 suspended therefrom and with polymer gel emulsion preparation equipment 7 at the bucket 4. The polymer gel preparation equipment 7 adds the polymer gel to water W in appropriate amounts and with sufficient sheer forces to provide activated water and polymer gel emulsion for delivery from the bucket 4 as a firefighting agent.

In essence, and with particular reference to FIGS. 1-5, basic details of the pod 10 and associated equipment are described, according to a most preferred embodiment. The pod 10 includes structural components to facilitate structural support of the pod 10 and an underlying bucket 4 suspended from an aircraft 2 above the pod 10. The pod 10 also includes functional elements to achieve the purpose of storing polymer gel and delivering polymer gel to water and polymer gel emulsion preparation equipment 7 within the bucket 4.

Structurally, the pod 10 includes a central shaft 20 of a high strength rigid construction extending from an upper end 22 to a lower end 26. The upper end 22 is configured to be suspended beneath the cable 12 extending down from the aircraft 2. The lower end 26 is configured to have portions of the bucket 4 attached thereto. The central shaft 20 has a hollow core through which various different lines can pass, both to supply power and control signals to equipment within the pod 10 and equipment at the bucket 4, the lines originating above the pod 10, such as at the aircraft 2. The central shaft 20 passes through an upper bulkhead 30 and a lower bulkhead 60. The upper bulkhead 30 supports some equipment associated with the function of the pod 10, including legs 40 for propping up the pod 10 during filling thereof, and a pressure equalization assembly 50 for equalizing pressure between an interior of a tank 70 between the bulkheads 30, 60 and a surrounding environment. A polymer gel emulsion pump 64, preferably mounted to the lower bulkhead 60 is also provided as part of the pod 10 for delivery of polymer gel from the tank 70 down to polymer gel emulsion preparation equipment 7 at the bucket 4. The tank 70 stores polymer gel between the bulkheads 30, 60 and is also bounded by an outer wall 72 extending between the upper bulkhead 30 and the lower bulkhead 60.

Figure 1:
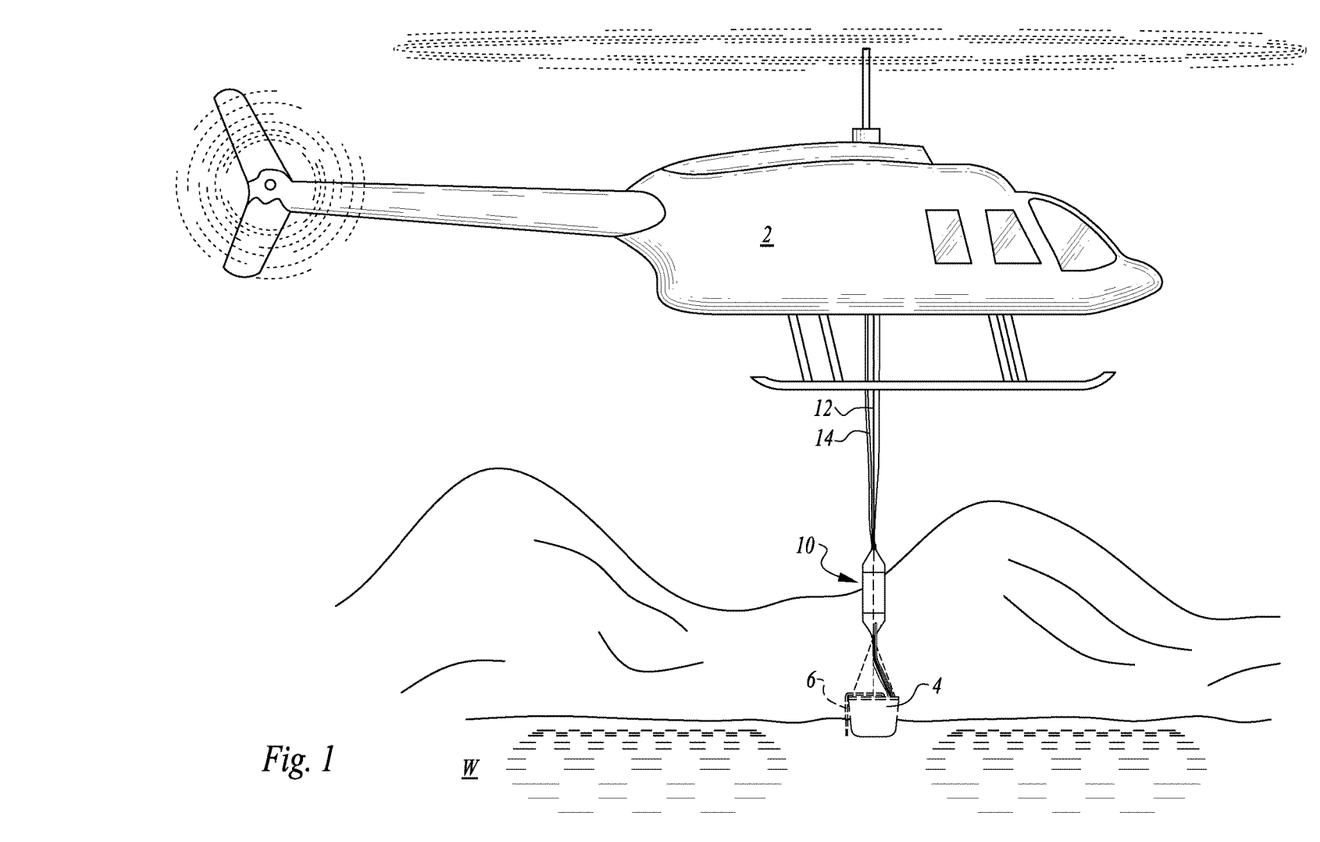
FIG. 1 is a side elevation view of the aircraft and bucket of this invention with a pod according to this invention interposed therebetween.
Figure 2:
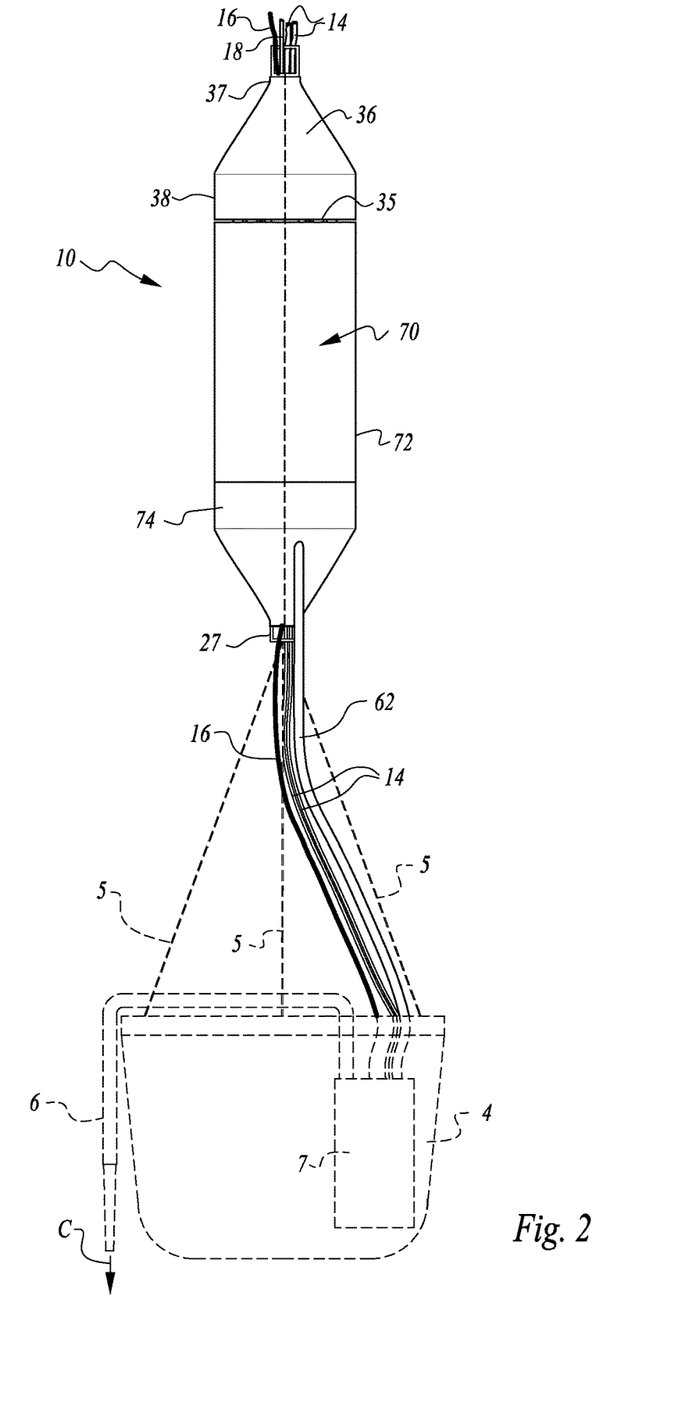
FIG. 2 is a side elevation view of a detail of a portion of that which is shown in FIG. 1, illustrating further details of the pod of this invention.
Figure 3:
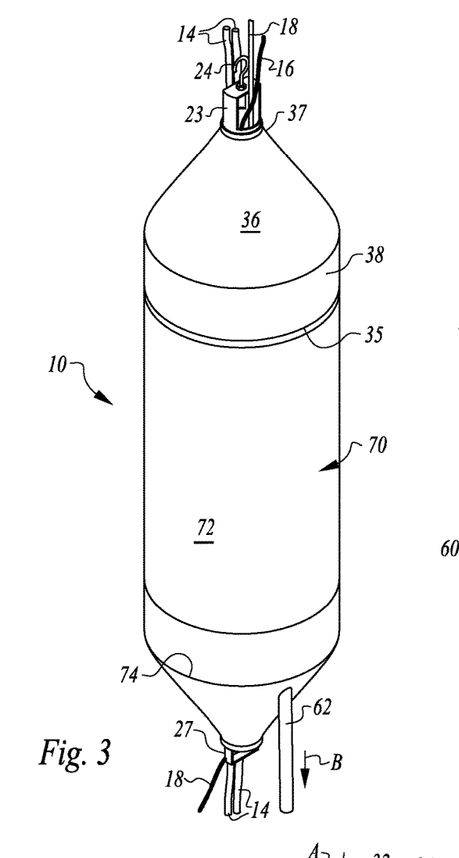
FIG. 3 is a perspective view of the pod of this invention.

More specifically, and with particular reference to FIGS. 1 and 2, particular details of the aircraft 2 and bucket 4 making up a firefighting system suitable for use of the pod 10 of this invention are described, according to a preferred embodiment. The firefighting equipment utilizing the pod 10 preferably includes an aircraft 2 with a bucket 4 suspended beneath the aircraft 2 by a cable 12. The aircraft 2 is preferably a rotary wing aircraft, such as a helicopter, typically including a single rotary wing axis, but optionally including multiple rotary wings either coaxial or with rotational axes spaced from each other.

The bucket 4 is located beneath the aircraft 2, typically along a centerline close to a center of mass and a center of lift for the aircraft 2. The bucket 4 typically has an open top so that it can be dipped into a body of water W and lifted out of the body of water W, so that the bucket 4 can be filled. The bucket 4 typically includes a floor which can be opened to dump the water W, or other equipment to facilitate tipping of the bucket 4 for dumping of water W therefrom. In other systems, such as those disclosed in co-pending U.S. patent application Ser. No. 12/660,044, incorporated herein by reference in its entirety, a nozzle 6 is provided upon the bucket 4 and a pump which draws water out of the bucket 4 and sprays water W through the nozzle 6 downwardly onto an area to be defended against wildfire.

Such equipment 7 beneficially includes an input for polymer gel upstream of the pump, and with the pump configured as a dynamic pump, such as a centrifugal or axial pump. In such a configuration, polymer gel is both added to the water and activated by sheer forces applied by the impeller of the pump, so that a water and polymer gel emulsion combination is provided which is thoroughly activated and ready to be applied, such as by spraying through the nozzle 6, downwardly onto vegetation and other combustible items in defending against fire. Together, such equipment 7 included on the bucket 4 is referred to as polymer gel emulsion preparation equipment 7. This equipment 7 receives water from within the bucket 4, adds polymer gel from the polymer outlet 62 and polymer gel pump 64 (along arrow B of FIG. 2) and sprays out the combination of water and polymer gel emulsion from the nozzle 6, along arrow C of FIG. 2.

The cable 12 is a high tensile strength elongate structure typically similar to that utilized in prior art systems where a bucket 4 is suspended beneath an aircraft 2. Rather than having the cable 12 connect directly to the bucket 4, the pod 10 is suspended from a lower end of the cable 12. Then in turn, the bucket 4 is coupled to the pod 10. In this way, existing cable 12 can be utilized as one option in the system of this invention.

In addition to the cable 12, hydraulic lines 14 (or other pump power line(s)) and a control line 16 also preferably extend down from the aircraft 2 to the pod 10, and past the pod 10 onto the bucket 4. The hydraulic lines 14 provide a preferred source of power for a pump associated with the polymer gel emulsion preparation equipment 7 within the bucket 4. The control line 16 delivers control signals to various equipment associated with the polymer gel emulsion preparation equipment 7 at the bucket 4. A separate power/control line 18 can also be routed from the aircraft 2 to the pod 10 to control equipment at the pod 10 and structures thereon, such as the polymer gel pump 64. To make the pod 10 as modular as possible, most preferably this control line 16 only supplies a control signal to the polymer gel preparation equipment within the bucket 4, with the separate power/control line 18 also passing down from the aircraft 2, but stopping at the pod 10 for providing power and control for the polymer gel pump 64, which doses polymer from the tank 70 within the pod 10 down to the polymer gel preparation equipment within the bucket 4. These various lines associated with the cable 12 can be separate but routed together along the cable 12, or can be bundled together within a single hybrid line, or separately provided but periodically bound together, such as with ties, to keep the various lines generally together adjacent the cable 12.

With particular reference to FIGS. 2-5, structural details of the pod 10 are described, according to this preferred embodiment. The pod 10 structurally acts as a portion of the suspension system, along with the cable 12, to suspend the weight of the bucket 4 beneath the aircraft 2. This load can be substantial, such as when the bucket 4 has been filled with water W. Rather than have the entire pod 10 formed out of thicker material around a periphery thereof to provide this required tensile strength through the pod 10, or utilization of exotic high strength materials, the pod 10 preferably includes an elongate shaft in the form of the central shaft 20, passing from an upper end 22 to a lower end 26 for carrying structural loads through the pod 10. This central shaft 20 is preferably hollow so that the central shaft 20 also can function as a conduit through which the various lines, such as the hydraulic lines 14, control line 16 and power/control line 18 can pass on their way down to the bucket 4 beneath the pod 10, or to lower portions of the pod 10.

The central shaft 20 is a rigid elongate cylindrical structure with a limited diameter, and a length similar to an overall length of the pod 10. While the central shaft 20 is preferably configured to extend along a vertical centerline of the pod 10, it is conceivable that the central shaft 20 or other shaft could be routed away from this centerline, such as closer to one side laterally of the pod 10 than another, or even within an outer wall of the pod 10 or outside of an outer wall of the pod 10. In such alternative embodiments, structural tensile strength would still preferably be provided through this elongate shaft to carry the weight of the bucket 4 up to the cable 12 through this central shaft.

The upper end 22 of the central shaft 20 includes an arch 23 thereon which crosses over the hollow core of the central shaft 20. A hook 24 preferably extends up from an upper portion of this arch 23 and is configured to be connected to a lower end of the cable 12. In one embodiment, the cable 12 has the same length as prior art cables configured to be coupled directly to a bucket 4. A pilot would then become accustomed to the additional length in the overall system provided by the pod 10. In an alternative embodiment, the cable is shortened by a length similar to a height of the pod 10, so that a distance from the aircraft 2 down to the bucket 4 remains the same when the pod 10 is interposed into this system, when compared to known prior art suspended bucket 4 firefighting aircraft 2. In this way, pilot skill associated with a bucket 4 a familiar distance from the aircraft 2, can be accommodated.

A body 25 of the central shaft 20 preferably has a constant cross-section from the upper end 22 down to the lower end 26, but could be irregular in cross-section and could be other than entirely straight, provided that the tension strength of the central shaft 20 is sufficient to carry the load of the pod 10 as well as the bucket 4 carrying the polymer gel emulsion preparation equipment 7, as well as a full load of water W.

The lower end 26 preferably includes a loop 27 spanning the lower end 26. A coupling 28, such as in the form of a ring or carabiner, is provided which is coupled to this loop 27 and is removably coupleable to the bucket 4. Most preferably, connection to the bucket 4 is through multiple rigid or flexible suspension elements 5 (FIG. 2) which extend diagonally from an apex point down to a rim of the bucket 4 or down to a ring which in turn connects to or near a rim of the bucket 4. Buckets 4 of different configurations can have different coupling systems generally referred to as the coupling for connecting the bucket 4 directly to the lower end 26 of the central shaft 20 of the pod 10.

In alternative embodiments, a further length of cable 12 could be provided between the pod 10 and the bucket 4, but most preferably the pod 10 is just above the bucket 4. In another embodiment, the cable 12 is not connected to the pod 10 directly, but rather the cable 12 passes through the central shaft 20 down to the bucket 4 with the bucket 4 connected directly to the cable 12 at the cable 12 lower end. The pod 10 can be separately attached to the cable 12 above the bucket 4, or can be attached to the bucket 4 suspended above the bucket 4, but not with the pod 10 directly coupled to the cable 12. It is also conceivable that the pod 10 could merely rest by gravity forces upon the suspension elements 5 or other portions of the bucket 4, with the bucket 4 suspended from the cable 12 in known prior art fashion. At locations such as at the lower end 26 of the central shaft 20 where the pod 10 abuts portions of the bucket 4 in such embodiments, appropriate padding or other interface structures can be provided to avoid wear or damage to portions of the cable 12 central shaft 20 or bucket 4.

With particular reference to FIGS. 3-8, details of equipment carried by the pod 10 are described, according to a most preferred embodiment. A primary function of the pod 10 is to provide a tank 70 for containing polymer gel before it is added to water W within the bucket 4. This tank 70 is preferably provided between an upper bulkhead 30 and a lower bulkhead 60 and inboard of an outer wall 72 of the pod 10. The bulkheads 30, 60 are planar structures oriented parallel with each other and spaced from each other, and preferably generally oriented perpendicular to a central axis of the pod 10 along the central shaft 20.

The central shaft 20 passes through both the upper bulkhead 30 and the lower bulkhead 60, with such intersections preferably in the form of a strong rigid joint, such as that formed by welding, to secure the bulkheads 30, 60 to the central shaft 20. The outer wall 72 is preferably cylindrical and defines an outer peripheral boundary of the tank 70.

The upper bulkhead 30 provides one convenient location for a fill tube 32 or other inlet into the tank 70. The fill tube 32 is shown with an elbow and with a removable cover (or back flow valve) on a tip of the fill tube 32. Other configurations of fill tube or other inlet could also be provided.

Standoffs 34 preferably extend vertically up from an upper surface of the upper bulkhead 30 a short distance defining a width of a gap 35 above the upper bulkhead 30. An upper shroud 36 having a generally conical form, but with a cylindrical skirt 38 at a lower portion thereof and a small cylindrical neck 37 at an upper end thereof, rests upon the upper bulkhead 30 and defines an uppermost portion of the pod 10 other than the central shaft 20. The neck 37 has a diameter which just allows the upper end 22 of the central shaft 20 to extend up therethrough. The skirt 38 has a diameter similar to that of the outer wall 72 of the tank 70 and a similar diameter to that of the upper bulkhead 30. The standoffs 34 keep the upper shroud 36 from resting directly upon the upper bulkhead 30, but instead exhibiting a gap 35 between the upper shroud 36 and the upper bulkhead 30.

This gap 35 ensures that space inboard of the upper shroud 36 remains open to a surrounding environment.

Figure 4:
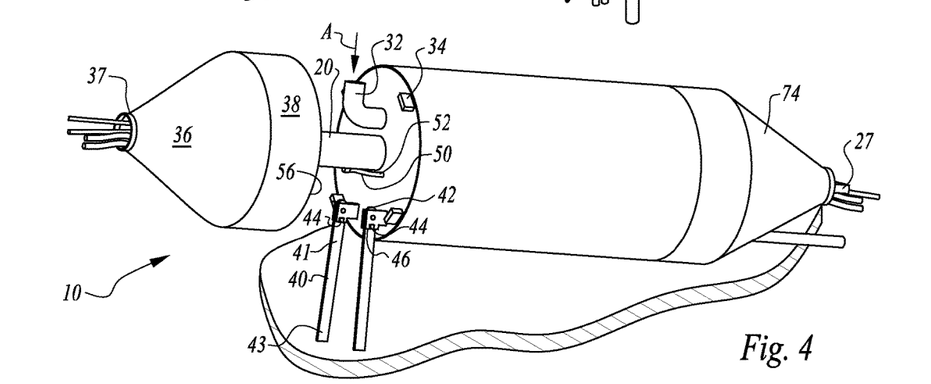
FIG. 4 is a perspective view of the pod of this invention when laying on its side upon legs in a configuration where an upper shroud has been lifted to expose a fill tube and the pod is oriented for filling of a polymer gel tank thereof.

The upper bulkhead 30 also preferably includes legs 40 pivotably attached thereto which allow the pod 10 to rest upon the ground (FIG. 4) and be tilted upward slightly and to cause the fill tube 32 to be pointed upwardly and positioned above the tank 70 for most convenient and complete filling of polymer gel into the tank 70 (along arrow A of FIG. 4). Pivoting of the legs 40 is accomplished about arrow D of FIGS. 5 and 6.

Figure 5:
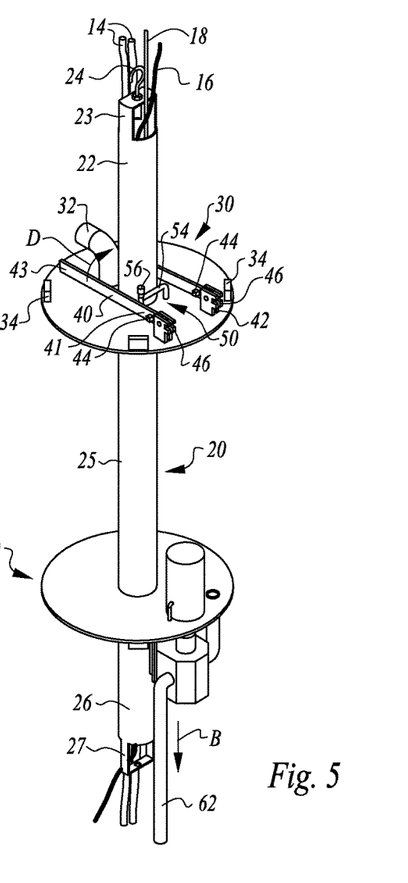
FIG. 5 is a perspective view of the pod of this invention with an outer wall, upper shroud and lower shroud removed therefrom to reveal interior details.
Figure 6:
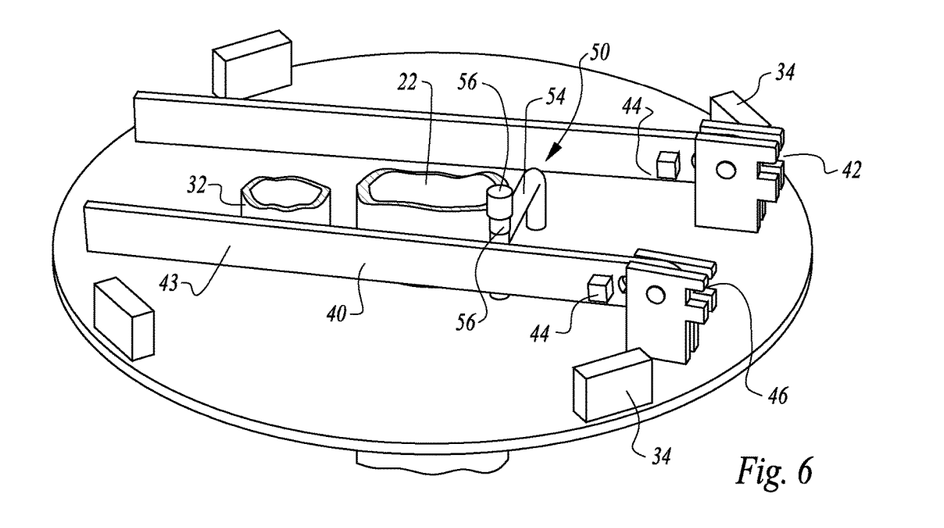
FIG. 6 is a detail of an upper bulkhead portion of that which is shown in FIG. 5.

Each leg 40 is pivotably coupled to the upper surface of the upper bulkhead 30 through pivot brackets 42. Each pivot bracket 42 can be configured as a pair of parallel plates with the leg 40 residing therebetween and coupled to the bracket 42 parallel plates through an axle. The legs 40 each include a proximal end 41 through which the legs 40 pivotably attach to the pivot brackets 42 and distal ends 43 configured to rest upon the ground when the legs 40 are deployed (FIG. 4).

When the legs 40 have been pivoted away from this deployed position into a stored position, the legs 40 have a length less than a width of the upper bulkhead 30, so that the legs 40 can rest upon an upper surface of the upper bulkhead 30 covered by the upper shroud 36. Stops 46 can be provided on the brackets 42 and tabs 44 extending laterally from the legs 40 so that pivoting of the legs 40 (along arrow D of FIG. 5) is restrained to a maximum amount of rotation where the legs 40 are securely supported by the pivot brackets 42 and so that the entire pod 10 can be firmly held in this slightly upwardly angled orientation. By pivoting the legs 40 to the brackets 42 through slots upon the axle, a slight translation can accompany pivoting (along arrow D) to secure the tabs 44 against the stops 46.

The upper shroud 36 is preferably not affixed to other portions of the pod 10, but merely rests upon the upper bulkhead 30, through the standoffs 34. Thus, when the legs 40 are to be pivoted and/or polymer gel is to be added to the tank 70 through the fill tube 32, the upper shroud 36 can be conveniently elevated along a central axis of the central shaft 20 to expose the fill tube 32 and legs 40 sufficient for their use (see FIG. 4).

The upper bulkhead 30 also preferably includes the pressure equalization assembly 50 thereon. The pressure equalization assembly 50 passes through a hole formed in the upper bulkhead 30 so that it has access to an interior of the tank 70. This pressure equalization assembly 50 includes an input end 52 through which access into the tank 70 interior is provided. The input end 52 exits the upper bulkhead 30 and then preferably includes a 90° angle followed by a tee 54. The tee 54 has two output tips 56 including an upper output tip opposite a lower output tip. The upper output tip 56 extends away from the upper bulkhead 30 and the lower output tip extends toward the upper bulkhead 30.

When the pod 10 is in position between the bucket 4 and the aircraft 2 and the bucket 4 and pod 10 are suspended beneath the aircraft 2, the upper output tip 56 extends vertically upward and the lower output tip 56 extends vertically downward. The upper output tip 56 is configured as a pressure relief with a check valve thereon which is pressure sensitive so that overpressure within the tank 70 interior can escape through the upper output tip 56. The lower output tip 56 is configured as a vacuum relief valve so that if under pressure within the tank 70 occurs relative to a surrounding atmosphere, such as when the tank 70 has polymer gel pumped out, air is allowed to pass from a surrounding atmosphere into the tank 70 interior through the lower output tip 56.

These output tips 56 can be configured similar to check valves, such as with a spring or other biasing member coupled to a flapper, ball or other closure element. When an appropriate pressure differential is sensed, one closure element is caused to move to an at least partially open position for either escape of over pressure gas from out of the tank 70 interior or for entry of air from a surrounding environment through the lower output tip 56 into the tank 70 interior. This pressure equalization assembly 50 ensures that the tank 70 need not withstand pressure related loads, but rather can be designed solely to carry the weight of the polymer gel. Weight of the pod 10 can thus be conserved.

Furthermore, the polymer gel pump 64 can have more consistent operating parameters in that it is never assisted by over pressure or inhibited by vacuum in its delivery of polymer gel to the polymer gel emulsion preparation equipment 7 within the bucket 4. Other potential problems such as polymer gel leakage through the polymer gel pump 64 into the polymer gel preparation system when not desired, can also be more readily managed when over pressure within the tank 70 is avoided. Over and under pressure conditions within the tank 70 can become more significant in many fire fighting situations due to mountainous terrain where wildfires often exist, and significant elevation changes between where the aircraft 2 takes on a load of water W into the bucket 4, and where the water and polymer gel emulsion are eventually discharged.

Figure 9:
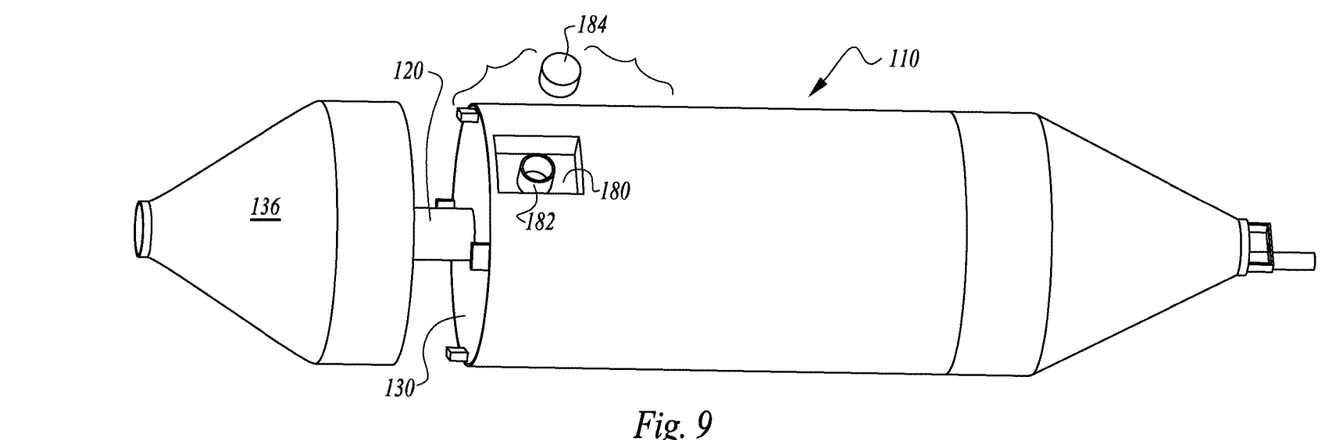
FIG. 9 is a perspective view of an alternative pod with a side fill inlet into the tank.
Figure 10:
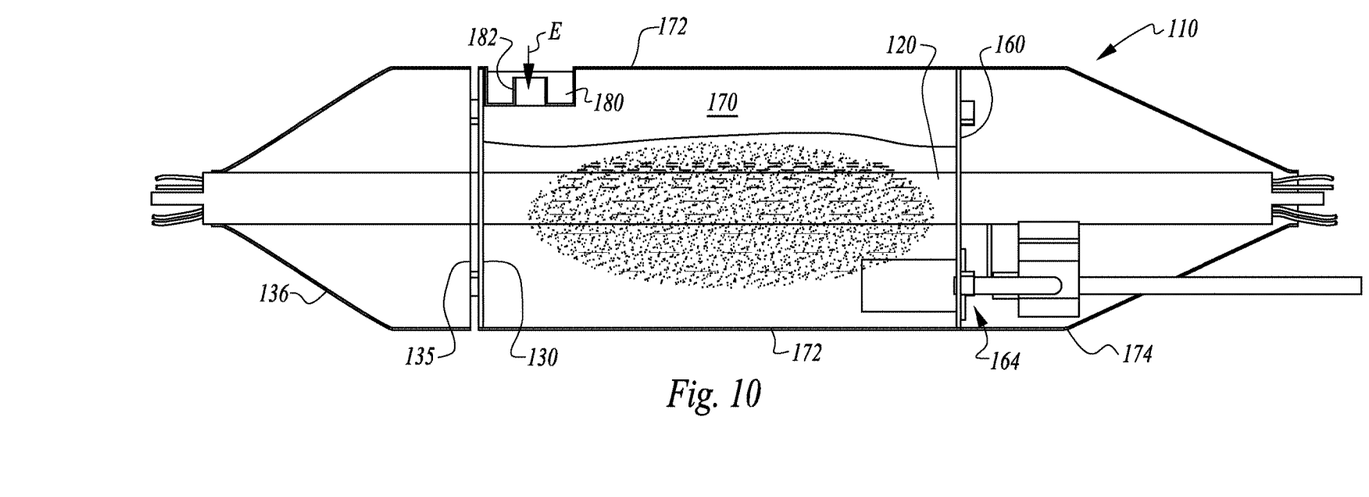
FIG. 10 is a full sectional view of that which is shown in FIG. 9, revealing interior details thereof.

The various equipment located on the upper bulkhead 30 could with appropriate modifications conceivably be located on the lower bulkhead 60 or in the outer wall 72 of the tank 70. In an embodiment depicted in FIGS. 9 and 10, such an alternative pod 110 with a side fill port is provided. In this embodiment, the pod 110 includes a central shaft 120, upper bulkhead 130, gap 135, upper shroud 136, lower bulkhead 160 and pump 164 similar to that of the pod 10 of previous embodiments. The pod 110 is merely rolled until a fill port 182 is pointed generally upward and then polymer gel is inserted through the port 182, after removal of or other opening of an appropriate fill cover 184. The fill port 182 is located in a recess 180 so the port 182 avoids damage when the pod 110 is on its side. The port 182 leads directly into a tank 170 inboard of an outer wall 172 of the pod 110 and above a lower shroud 174.

A lower bulkhead 60 (FIGS. 7 and 8) preferably includes the polymer outlet 62 passing out of the tank 70 and down to the polymer gel emulsion preparation equipment 7 within the bucket 4. This polymer outlet 62 passes through the lower bulkhead 60 and then into a polymer gel pump 64. The polymer gel pump 64 provides a dosing function to dose water W (upstream of a pump within the bucket 4) with polymer gel as part of the polymer gel emulsion preparation equipment, so that an appropriate amount of polymer gel is added to the water W. This appropriate amount can vary in different circumstances, so that the polymer gel pump 64 preferably is controllable as to the amount of polymer gel passing out of the tank 70.

Figure 7:
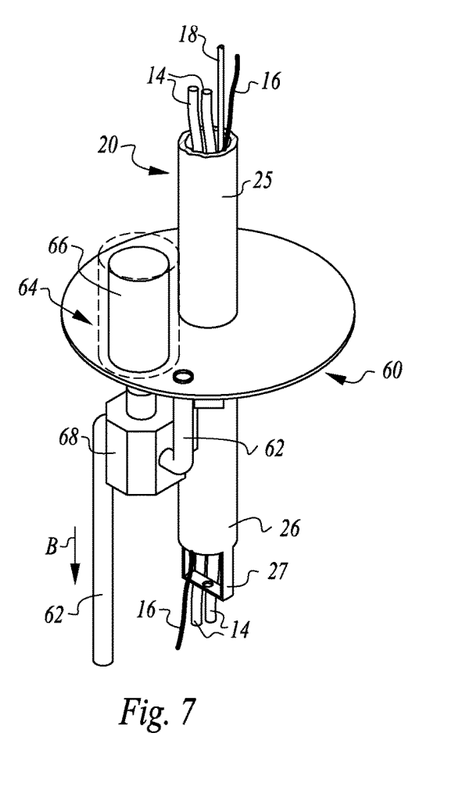
FIG. 7 is a perspective view from above of a lower bulkhead portion of that which is shown in FIG. 5.
Figure 8:
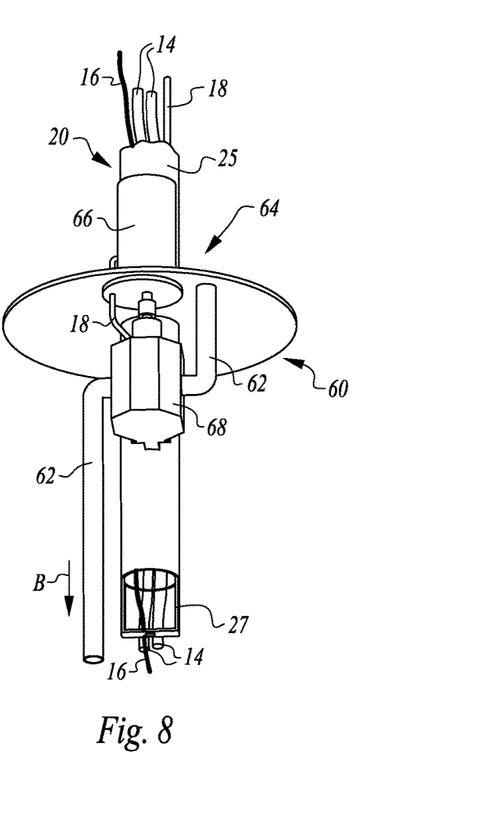
FIG. 8 is a perspective view from below of a lower bulkhead portion of that which is shown in FIG. 5.

The polymer gel pump 64 preferably includes two parts including a motor 66 and a driver 68. The motor 66 is shown in this preferred embodiment on an upper surface of the lower bulkhead 60, and actually residing within an interior of the tank 70. A driver 68 of the pump 64 is located beneath the lower bulkhead 60. A drive shaft would pass through the lower bulkhead 60 extending from the motor 66 to the driver 68. The power/control line 18 passes down through the central shaft 20 and then through a small hole exits the central shaft 20 beneath the lower bulkhead 60 and then is supplied back up through the lower bulkhead 60 to supply power and control to the motor 66 and/or the driver 68 of the pump 64.

The driver 68 is driven by the drive shaft from the motor 66 and includes prime movers which advance the polymer gel through the polymer outlet 62. This driver 68 could be in the form of a piston or series of pistons, or in the form of a gear or series of gears, or otherwise configured, typically in the form of a positive displacement pump, which delivers a highly accurate dose of polymer gel from the tank 70 down through the polymer outlet 62 to the polymer gel preparation equipment within the bucket 4. As an alternative, the driver 68 could be of a dynamic variety, but still preferably configured to provide an at least somewhat highly predictable flow rate of polymer gel therefrom. The polymer outlet 62 continues as a substantially flexible hollow line down to the polymer gel emulsion preparation equipment 7 within the bucket 4, typically as part of a bundle of lines including the hydraulic lines 14 and control line 16 down to the bucket 4, so that this bundle of lines can be effectively managed together and avoid interference with operation of the bucket 4.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A modular polymer gel storage and delivery system for aircraft having a water fillable and emptyable bucket with a polymer gel emulsion preparation assembly therein, the bucket suspended from the aircraft by a cable, the storage and delivery system comprising in combination:
   a pod;
   said pod including a polymer gel tank therein;
   a polymer gel outlet path routed from said tank toward the bucket suspended from the aircraft;
   a polymer gel supply pump downstream from said polymer gel tank and arranged to supply polymer gel from said tank to the bucket;
   a polymer gel fill inlet passing from outside said tank to inside said tank;
   said pod suspended between the bucket and the aircraft with the weight of said pod carried at least partially by the cable;
   wherein said pod includes a shaft extending through said pod from an upper end to a lower end, said shaft having a hollow core with at least one line passing through said shaft from said upper end to said lower end, with said at least one line extending up to the aircraft and extending down to the bucket; and
   wherein an electric power line for supplying power to said polymer gel pump extends from the aircraft through at least a portion of said hollow core of said shaft to said polymer gel pump.

2. The system of claim 1 wherein said shaft is located substantially along a central axis of said pod and passing through said polymer gel tank with said hollow core of said shaft isolated from the polymer gel within said tank.

3. The system of claim 2 wherein said shaft includes a cable connection at said upper end for attachment to a portion of the cable for carrying of said pod by said aircraft.

4. The system of claim 1 wherein said pod includes at least one bulkhead defining an end of said polymer gel tank closest to the aircraft, said bulkhead including said polymer gel fill inlet passing therethrough.

5. The system of claim 4 wherein at least two legs are pivotably attached to said bulkhead with said legs having a first stored position adjacent said bulkhead and laying flat upon said bulkhead and a second deployed position pivoted away from said bulkhead for standing of said pod at least partially upon said legs.

6. The system of claim 1 wherein at least one pressure relief valve is coupled to said polymer gel tank through said upper bulkhead, said at least one pressure relief valve at least partially equalizing pressure within said polymer gel tank with ambient pressure outside of said polymer gel tank.

7. A modular polymer gel storage and delivery system for aircraft having a water fillable and emptyable bucket with a polymer gel emulsion preparation assembly therein, the bucket suspended from the aircraft by a cable, the storage and delivery system comprising in combination:
   a pod;
   said pod including a polymer gel tank therein;
   a polymer gel outlet path routed from said tank toward the bucket suspended from the aircraft;
   a polymer gel supply pump downstream from said polymer gel tank and arranged to supply polymer gel from said tank to the bucket;
   a polymer gel fill inlet passing from outside said tank to inside said tank;
   said pod suspended between the bucket and the aircraft with the weight of said pod carried at least partially by the cable;
   wherein said pod includes at least one bulkhead defining an end of said polymer gel tank closest to the aircraft, said bulkhead including said polymer gel fill inlet passing therethrough;
   wherein at least two legs are pivotably attached to said bulkhead with said legs having a first stored position adjacent said bulkhead and laying flat upon said bulkhead and a second deployed position pivoted away from said bulkhead for standing of said pod at least partially upon said legs; and
   wherein a movable upper shroud defines a portion of said pod above said bulkhead, said movable upper shroud removably covering said polymer gel inlet and said legs, standoffs extending up from said bulkhead a distance defining a height for said standoffs, said upper shroud spaced from said bulkhead by a gap having a width similar to said height of said standoffs.

8. A modular polymer gel storage and delivery system for aircraft having a water fillable and emptyable bucket with a polymer gel emulsion preparation assembly therein, the bucket suspended from the aircraft by a cable, the storage and delivery system comprising in combination:
   a pod;
   said pod including a polymer gel tank therein;
   a polymer gel outlet path routed from said tank toward the bucket suspended from the aircraft;

a polymer gel supply pump downstream from said polymer gel tank and arranged to supply polymer gel from said tank to the bucket;

a polymer gel fill inlet passing from outside said tank to inside said tank;

said pod suspended between the bucket and the aircraft with the weight of said pod carried at least partially by the cable;

said pod flexibly and removably coupled to both the aircraft and the bucket;

wherein said pod is suspended from a pod suspension line extending from the aircraft, and wherein said bucket is suspended from said pod;

wherein said pod includes a shaft extending through said pod from an upper end to a lower end; and wherein said lower end of said shaft has at least one bucket suspension line coupled thereto and extending downward therefrom, from which the bucket is suspended.

9. The system of claim 8 wherein a loop is provided on said lower end of said shaft, said bucket suspension line coupled to said loop.

10. The system of claim 8 wherein said polymer gel supply line includes a flexible line extending down beyond all of said pod and toward said bucket, said flexible polymer gel supply line flexible along with at least one bucket suspension line from which the bucket is suspended.

11. The system of claim 10 wherein said polymer gel supply line extends down to polymer gel preparation equipment which combines the polymer gel from said flexible polymer gel supply line with water through a pump which includes an impeller which acts on polymer gel passing therethrough with sufficient shear upon said polymer gel to activate said polymer gel concentrate and water combination.

* * * * *